(12) United States Patent
Zhang et al.

(10) Patent No.: US 11,267,742 B2
(45) Date of Patent: Mar. 8, 2022

(54) BUILT-IN MICRO-INTERFACE PAPERMAKING WASTEWATER TREATMENT SYSTEM AND WASTEWATER TREATMENT METHOD THEREOF

(71) Applicant: NANJING YANCHANG REACTION TECHNOLOGY RESEARCH INSTITUTE CO., LTD., Nanjing (CN)

(72) Inventors: Zhibing Zhang, Nanjing (CN); Zheng Zhou, Nanjing (CN); Feng Zhang, Nanjing (CN); Lei Li, Nanjing (CN); Weimin Meng, Nanjing (CN); Baorong Wang, Nanjing (CN); Gaodong Yang, Nanjing (CN); Huaxun Luo, Nanjing (CN); Guoqiang Yang, Nanjing (CN); Hongzhou Tian, Nanjing (CN); Yu Cao, Nanjing (CN)

(73) Assignee: NANJING YANCHANG REACTION TECHNOLOGY RESEARCH INSTITUTE CO., LTD., Nanjing (CN)

( * ) Notice: Subject to any disclaimer, the term of this patent is extended or adjusted under 35 U.S.C. 154(b) by 0 days.

(21) Appl. No.: 17/432,969

(22) PCT Filed: May 27, 2020

(86) PCT No.: PCT/CN2020/092689
§ 371 (c)(1),
(2) Date: Aug. 23, 2021

(87) PCT Pub. No.: WO2021/189634
PCT Pub. Date: Sep. 30, 2021

(65) Prior Publication Data
US 2022/0041484 A1    Feb. 10, 2022

(30) Foreign Application Priority Data
Mar. 24, 2020    (CN) .......................... 202010215132.1

(51) Int. Cl.
*C02F 9/00* (2006.01)
*C02F 1/72* (2006.01)
(Continued)

(52) U.S. Cl.
CPC ................ *C02F 9/00* (2013.01); *C02F 1/001* (2013.01); *C02F 1/02* (2013.01); *C02F 1/20* (2013.01);
(Continued)

(58) Field of Classification Search
CPC ........................................ C02F 9/00
See application file for complete search history.

(56) References Cited

FOREIGN PATENT DOCUMENTS

| CN | 208120937 U | 11/2018 |
| CN | 110316808 A | 10/2019 |

*Primary Examiner* — Peter Keyworth

(57) ABSTRACT

A built-in micro-interface papermaking wastewater treatment system and a treatment method are provided in the present invention. The treatment system includes a papermaking wastewater tank, a grid cleaner, an adjustment tank, a centrifugal filter and a sedimentation tank which are connected in sequence, and further includes a heat exchanger, a preheater, a wet oxidation reactor, a gas-liquid separator and a biodegradation tank. A micro-interface unit for dispersing and crushing gas into gas bubbles is disposed inside the wet oxidation reactor. The micro-interface unit includes a pneumatic micro-interface generator, a gas inlet is disposed at a side wall of the wet oxidation reactor, and the gas inlet extends to an interior of the pneumatic micro-interface generator through a pipeline. By arranging the micro-interface unit inside the wet oxidation reactor of the treatment system, the consumption of air or oxygen can be reduced, which realizes low energy consumption and high treatment efficiency.

9 Claims, 1 Drawing Sheet

(51) Int. Cl.
*C02F 1/00* (2006.01)
*C02F 1/02* (2006.01)
*C02F 1/74* (2006.01)
*C02F 1/20* (2006.01)
*C02F 103/28* (2006.01)
*C02F 3/00* (2006.01)
*C02F 101/20* (2006.01)
*C02F 101/30* (2006.01)
*C02F 1/38* (2006.01)

(52) U.S. Cl.
CPC ................ *C02F 1/38* (2013.01); *C02F 1/725* (2013.01); *C02F 1/727* (2013.01); *C02F 1/74* (2013.01); *C02F 3/00* (2013.01); *C02F 2001/007* (2013.01); *C02F 2101/20* (2013.01); *C02F 2101/30* (2013.01); *C02F 2103/28* (2013.01); *C02F 2209/08* (2013.01); *C02F 2301/046* (2013.01); *C02F 2303/26* (2013.01)

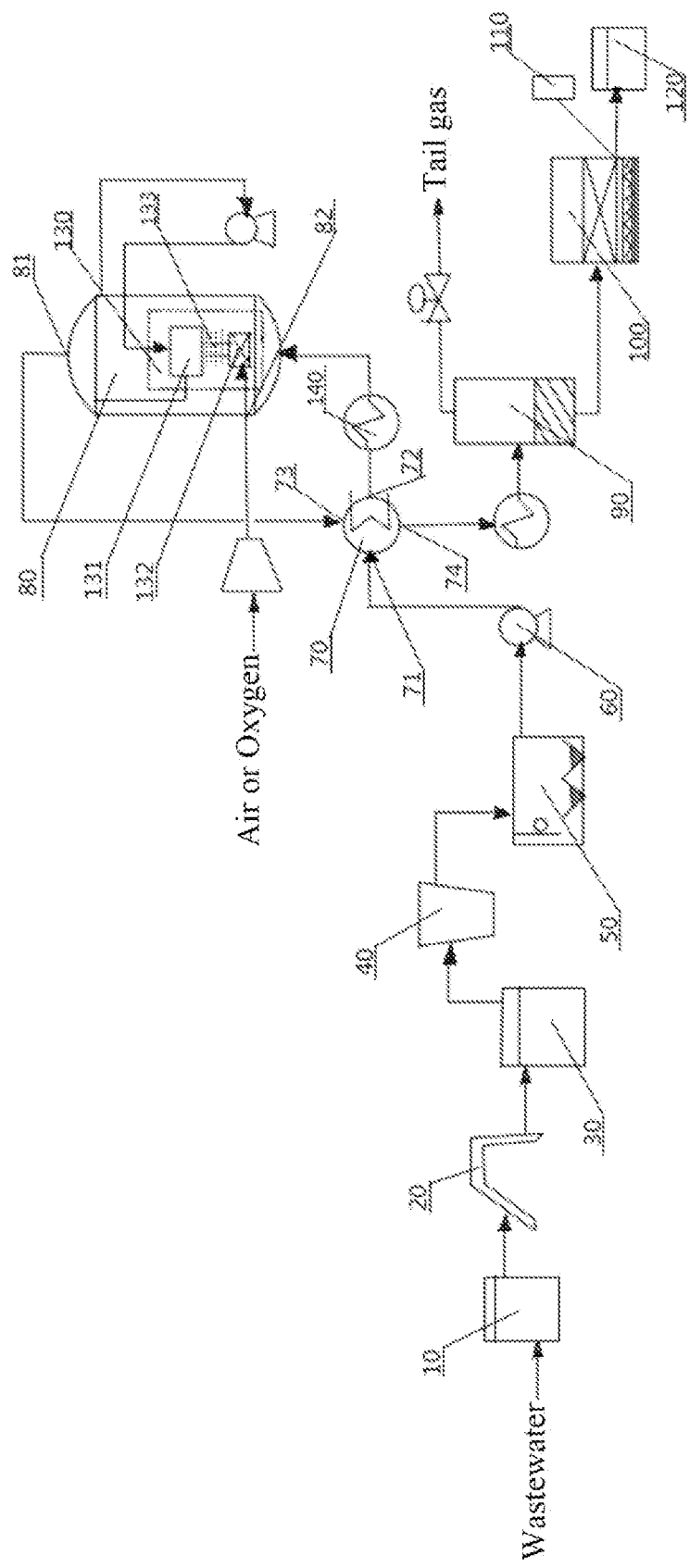

BUILT-IN MICRO-INTERFACE PAPERMAKING WASTEWATER TREATMENT SYSTEM AND WASTEWATER TREATMENT METHOD THEREOF

BACKGROUND OF THE APPLICATION

Technical Filed

The invention relates to the technical field of a papermaking wastewater treatment, in particular, to a built-in micro-interface papermaking wastewater treatment system and a wastewater treatment method thereof.

Description of Related Art

Papermaking industry is the traditional major water consumer, and is one of the biggest pollutant sources that cause water pollution. The discharge of industrial papermaking wastewater in China ranks first among all kinds of industrial discharges. The papermaking industry causes the most serious pollution to the water environment, which is not only the primary problem of pollution prevention and control of papermaking industry in China, but also the primary problem of performing standard treatment of industrial wastewater in China.

The chemical components contained in papermaking wastewater are relatively complex, and the temperature of the wastewater is relatively high. For this reason, the wastewater treatment process in combination with physical, chemical and biochemical methods is adopted in industry. At present, wet oxidation technology is more successful in treating papermaking wastewater by combining with other processes due to its strong adaptability and good treatment effect. However, the wet oxidation method requires a relatively high reaction temperature, pressure, and relatively long residence time. The reasons are that the residence time of air or oxygen in a liquid phase is short, a mass transfer time is insufficient, the diameter of gas bubbles is large, the interfacial area of a gas-liquid phase formed in a reactor is relatively small, and the mass transfer space is insufficient, thereby causing the problems of an excessively long reaction time, high energy consumption, and low reaction efficiency.

In view of this, the present invention is proposed.

SUMMARY

A first objective of the present invention is to provide a built-in micro-interface papermaking wastewater treatment system. By adding a micro-interface unit inside a wet oxidation reactor of the wastewater treatment system, a mass transfer effect between two phases is improved and a reaction efficiency is increased. Gas bubbles can be broken into micron-scale gas bubbles, increasing an interfacial area of the gas-liquid phase, enabling mass transfer space to be fully satisfied, increasing the residence time of air or oxygen in the liquid phase, and reducing the consumption of air or oxygen. Even if the temperature and the pressure need not be too high, the high reaction efficiency of the reaction itself can be ensured, a series of potential safety hazards caused by high temperature and high pressure can be avoided, being conducive to energy saving and consumption reduction of the reaction process, and having low cost.

A second objective of the present invention is to provide a papermaking wastewater treatment method by using the above-described treatment system. The treatment method has simple operations, mild operation conditions and low energy consumption, and achieves a better treatment effect than that of the prior art.

In order to achieve the above objectives of the present invention, the following technical solutions are specially adopted.

The invention provides a built-in micro-interface papermaking wastewater treatment system, including a papermaking wastewater tank, a grid cleaner, an adjustment tank, a centrifugal filter, a sedimentation tank, a heat exchanger, a preheater, a wet oxidation reactor, a gas-liquid separator and a biodegradation tank which are connected in sequence, wherein a first inlet, a first outlet, a second inlet, and a second outlet are disposed on the heat exchanger; wherein the sedimentation tank is connected to the first inlet, the first outlet is connected to a bottom of the wet oxidation reactor through the preheater, an oxidation outlet is disposed on a top of the wet oxidation reactor, the oxidation outlet is connected to the second inlet, the second outlet is connected to the gas-liquid separator, and the gas-liquid separator is connected to the biodegradation tank; and wherein a micro-interface unit for dispersing and crushing gas into gas bubbles is disposed inside the wet oxidation reactor, the micro-interface unit comprises a pneumatic micro-interface generator, a gas inlet is disposed at a side wall of the wet oxidation reactor, and the gas inlet extends to an interior of the pneumatic micro-interface generator through a pipeline.

In a papermaking wastewater treatment process in the prior art, a wet oxidation treatment method often needs a relatively high reaction temperature, a relatively high reaction pressure and a relatively long residence time. The reasons are that the residence time of air or oxygen in a liquid phase is short, a mass transfer time is insufficient, the diameter of gas bubbles is large, the interfacial area of a gas-liquid phase formed in a reactor is relatively small, and the mass transfer space is insufficient, thereby causing problems of an excessively long reaction time, high energy consumption and low reaction efficiency.

In the above-described pretreatment system, certain pretreatments must be performed before the wet oxidation treatment. The pretreatment system includes a papermaking wastewater tank, a grid cleaner, an adjustment tank, a centrifugal filter, and a sedimentation tank, wherein the above treatment devices are connected in sequence. The wastewater discharged from the papermaking process first enters the papermaking wastewater tank to be treated. The papermaking wastewater tank is used for adjusting the water volume and pumping volume. Because the wastewater contains toxic, harmful or flammable volatile substances, the papermaking wastewater tank is designed as a closed type, and ventilation holes are disposed at the two positions with the largest distance from the surface of the tank, so as to form the maximum convection of the air above the liquid surface. The wastewater from the tank enters the grid cleaner to remove large-scale floating substances and suspended substances. The material of the grid cleaner is not limited, preferably rotary rake grid, stepped grid, arc-shaped grid or spiral grid. Then, the wastewater from the grid cleaner enters the adjustment tank to adjust the water volume and water quality, so as to make the water quality uniform and prevent the excessive water volume from impacting the subsequent treatment device. The differential flow adjustment tank is preferred. Compared with other adjustment tanks, the differential flow method does not have any operation cost, thereby reducing costs. The adjusted wastewater then enters the centrifugal filter. The suspended particles in the wastewater are separated after centrifugation. The liquid obtained by centrifugal filtration enters the sedimentation tank to remove heavy metals and particulate substances by gravity sedimentation. The sedimentation tank can be any one of horizontal flow sedimentation tank, vertical flow sedimentation tank, radial flow sedimentation tank, inclined plate or inclined pipe sedimentation tank and horizontal pipe sedimentation tank.

The wastewater is subjected to preliminary pretreatment measures such as removal and precipitation in the above-described pretreatment system, and is subjected to a subsequent wet oxidation treatment so as to achieve a deeper wastewater purification effect.

It should be noted that, by disposing a micro-interface unit inside a wet oxidation reactor of the treatment system, air or oxygen that enters the wet oxidation reactor is broken and dispersed into gas bubbles, which enables the gas bubbles and wastewater to form a gas-liquid emulsion, thereby increasing an interfacial area between the gas and the wastewater, and further increasing reaction efficiency. After the mass transfer effect of a reaction phase interface is increased, a high operation temperature and a high operation pressure are not required, which achieves the effects of low energy consumption and low operation cost.

The micro-interface unit of the present invention includes a pneumatic micro-interface generator, so that air or oxygen compressed by an air compressor enters from an air inlet to an interior of the pneumatic micro-interface generator. Through the breaking and dispersing function of the micro-interface generator, the gas is dispersed and broken into micro gas bubbles, thereby reducing the thickness of a liquid film, effectively increasing the mass transfer area between the air or oxygen and wastewater, reducing mass transfer resistance, and improving the reaction efficiency.

More preferably, the micro-interface unit further includes a hydraulic micro-interface generator, and wastewater circulating back from the wet oxidation reactor is introduced into the hydraulic micro-interface generator. The hydraulic micro-interface generator is connected to a gas guide pipe, and a top end of the gas guide pipe extends out above a liquid surface of the wet oxidation reactor for recovering air or oxygen. A large amount of unreacted air and/or oxygen will accumulate above the wet oxidation reactor in the reaction process. In order to be sufficiently recycled, the air guide pipe enters the bottom again for multiple recycling reactions so as to increase the mass transfer efficiency, and the recycling of the wastewater introduced can achieve the effect of providing power for the hydraulic micro-interface generator.

Further, in order to better supply a hydraulic force to the hydraulic micro-interface generator, a wastewater circulation pipeline for communicating wastewater circulating back from the wet oxidation reactor is further disposed outside the wet oxidation reactor. One end of the wastewater circulation pipeline is connected to a side wall of the wet oxidation reactor, and the other end of the wastewater circulation pipeline is connected to the top of the hydraulic micro-interface generator.

It can be seen that, unreacted air or oxygen during the reaction process leaves the liquid surface and rises to the top of the wet oxidation reactor. Under the power action of the circulation pipeline and under the entrainment action of hydraulic micro-interface generator, unreacted air or oxygen is entrained into the hydraulic micro-interface generator through the gas guide pipe, dispersed and broken, and then sent to the bottom of the reactor for continuing to participate in the reaction. In order to provide power, a circulation pump is disposed on the wastewater circulation pipeline. The circulation pump can be a vertical pump or a horizontal pump, the number of pumps is not limited, and one or more pumps can be mounted in series or in parallel.

Further, the setting mode, the setting position, and the number of the micro-interface generators contained in the micro-interface unit are not limited.

Further, an outlet of the hydraulic micro-interface generator is disposed opposite to an outlet of the pneumatic micro-interface generator so as to clash and enhance the reaction effect. The hydraulic micro-interface generator is disposed at an upper position in the wet oxidation reactor, the pneumatic micro-interface generator is disposed at a lower position in the wet oxidation reactor, and the outlets of the two micro-interface generators are disposed opposite to each other up and down. In this way, the gas bubbles generated by the hydraulic micro-interface generator move downwards, and the bubbles generated by the pneumatic micro-interface generator move upwards, and the collision between them can produce smaller bubbles, which further increases the contact area and speeds up the reaction efficiency.

Further, a plurality of support plates for mutual support are disposed between the hydraulic micro-interface generator and the pneumatic micro-interface generator. The plurality of support plates are sequentially stacked from top to bottom. An anti-slip pad or an anti-slip ring is disposed between two adjacent support plates of the plurality of support plates, and a number of the support plates is not limited. The anti-slip pad or the anti-slip ring is used for preventing slippage between the two adjacent support plates. The plurality of support plates bear the impact pressure caused by a vigorous reaction in the wet oxidation reactor, which achieves a good reinforcement effect. The specific material, shape and number of the plurality of support plates are not limited.

A person skilled in the art would understand that the micro-interface generator used in the present invention is embodied in the prior patent of the present invention. For example, in a CN patent with a publication no. 106215730 A, the core of the micro-interface generator is gas bubble crushing. The principle of a bubble breaker is that the gas carried by high-speed jet collides with each other for energy transfer, so as to break up the gas bubbles. One embodiment of the structure of the micro-interface generator is disclosed in the above-described patent, and will not be repeated redundantly herein. The connection between the micro-interface generator and the wet oxidation reactor, including a connection structure and a connection position, is determined according to the structure of the micro-interface generator, and is not limited herein. The reaction mechanism and control method for the micro-interface generator are disclosed in the inventor's prior patent CN 107563051 B, and will not be repeated redundantly herein.

Further, a booster pump is disposed between the sedimentation tank and the heat exchanger. A pressure monitoring module and a control module are also disposed inside the booster pump. During the process, if the pressure is monitored to be excessively high or excessively low, the control module can turn on or turn off the booster pump at any time. The booster pump can also be connected in series or in parallel to implement a multi-stage boosting, and the multi-stage boosting can be used for adjusting the pressure according to actual needs.

Further, the treatment system further includes a COD concentration detection device and a clean water tank, wherein the COD concentration detection device is connected to a water outlet of the biodegradation tank for monitoring the water quality and discharging the water into the clean water tank after being qualified. Through the COD concentration detection, it can be timely detected whether a wastewater treatment index meets requirements, and it can also be monitored whether a problem occurs in the entire treatment system, facilitating timely repair. The clean water tank is preferably disposed with an ultraviolet or ozone disinfection device, and the treated water is recycled after being disinfected.

Further, the wet oxidation reactor is a bubble slurry bed reactor. In the bubble slurry bed reactor, a solid catalyst can float above a liquid phase, so that the catalyst can be replaced without catalyst sintering when the operation is stopped.

Furthermore, the present invention also provides a papermaking wastewater treatment method, including the following steps:

a papermaking wastewater first entering a grid cleaner and then removing large-scale floating substances and suspended substances, then entering an adjustment tank to regulate a water volume and a water quality, and then entering a centrifugal filter; separating suspended particles from the papermaking wastewater under an action of centrifugal force, and liquid obtained by centrifugal filtration entering a sedimentation tank to remove heavy metals and particulate sub stance precipitates;

heating the wastewater treated by the above steps and then entering a wet oxidation reactor for a wet oxidation treatment, introducing compressed air or oxygen into the wet oxidation reactor to cause an oxidative decomposition reaction of organic substances in the wastewater, and dispersing and crushing the compressed air or oxygen through a micro-interface unit; and the product after the wet oxidation treatment entering a gas-liquid separator after heat exchange, and the separated liquid entering a biodegradation tank for biodegradation and being recovered after reaching the standard.

Preferably, a reaction temperature of the wet oxidation treatment is 175-185° C., and a reaction pressure is 3.1-3.6 MPa. An optimum reaction temperature is 180° C., and an optimum reaction pressure is 3.3 MPa.

By adopting the above-mentioned built-in micro-interface papermaking wastewater treatment system and the papermaking wastewater treatment method, the treatment efficiency is improved, and the fusion degree between air or oxygen and the wastewater is increased. A good treatment effect can be achieved even at a relatively low temperature and a relatively low pressure, which can fully reduce energy consumption.

The wastewater treatment method and the wastewater treatment method of the present has simple and convenient operations, milder operating conditions, and lower energy consumption, which can achieve a better treatment effect than the existing process.

Compared with the prior art, the present invention has the following beneficial effects.

(1) A micro-interface unit is disposed inside a wet oxidation reactor, improving mass transfer effect and reaction efficiency between two phases. Gas bubbles can be broken into micron-level bubbles, increasing the interfacial area between a gas phase and a liquid phase, enabling mass transfer space to be fully satisfied, increasing the residence time of air or oxygen in the liquid phase, reducing the consumption of air or oxygen, such that a high temperature and a high pressure are not required. The efficient progress of the reaction itself can be ensured, which avoids a series of potential safety hazards caused by high temperature and high pressure, facilitates energy saving and consumption reduction in the reaction process, and reduces the cost.

(2) The present invention also significantly reduces the reaction temperature and the reaction pressure and reduces the energy consumption of the air compressor. In the wet oxidation process, the oxidation of the organic substances generates a large amount of heat, which can basically maintain the self-supply of heat during the operation of the device. The operational cost is primarily the energy consumption of the air compressors and pumps, wherein the air compressors account for the majority of the energy consumption. The outlet pressure of the compressor is reduced, significantly reducing the energy consumption of the compressor, and reducing costs for enterprises.

BRIEF DESCRIPTION OF DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the invention. Also, throughout the drawings, the same reference numerals are used to denote the same components. In the drawings:

FIG. 1 is a structural diagram of a built-in micro-interface papermaking wastewater treatment system according to an embodiment of the present invention.

DETAIL DESCRIPTION

In order to make the purpose and advantages of the invention clearer, the invention will be further described below in conjunction with the embodiments. It should be understood that the specific embodiments described here are only used to explain the invention, and are not used to limit the invention.

It should be understood that in the description of the invention, orientations or position relationships indicated by terms upper, lower, front, back, left, right, inside, outside and the like are orientations or position relationships are based on the direction or position relationship shown in the drawings, which is only for ease of description, rather than indicating or implying that the device or element must have a specific orientation, be constructed and operated in a specific orientation, and therefore cannot be understood as a limitation of the invention.

Further, it should also be noted that in the description of the invention, terms "mounting", "connected" and "connection" should be understood broadly, for example, may be fixed connection and also may be detachable connection or integral connection; may be mechanical connection and also may be electrical connection; and may be direct connection, also may be indirection connection through an intermediary, and also may be communication of interiors of two components. Those skilled in the art may understand the specific meaning of terms in the invention according to specific circumstance.

In order to explain the technical solutions of the present invention more clearly, specific embodiments are used for description below.

Embodiments

Referring to FIG. 1, a built-in micro-interface papermaking wastewater treatment system according to an embodiment of the present invention includes a papermaking wastewater tank 10, a grid cleaner 20, an adjustment tank 30, a centrifugal filter 40 and a sedimentation tank 50 which are connected in sequence, and further includes a heat exchanger 70, a preheater 140, a wet oxidation reactor 80, a gas-liquid separator 90 and a biodegradation tank 100. A first inlet 71, a first outlet 72, a second inlet 73, and a second outlet 74 are disposed on the heat exchanger 70. The sedimentation tank 50 is connected to the first inlet 71 through a booster pump 60; and the first outlet 72 is connected to the bottom of the wet oxidation reactor 80 through the preheater 140. After heat exchange, the wastewater is preheated before entering the wet oxidation reactor 80. An oxidation outlet 81 is disposed on the top of the wet oxidation reactor 80, the oxidation outlet 81 is connected to the second inlet 73, the oxidation water coming out of the oxidation outlet 81 enters the heat exchanger 70 through the second inlet 73 for heat exchange, and the wastewater to be treated is heated while being cooled, so as to achieve the effect of fully utilizing energy. In addition, the second outlet 74 is connected to the gas-liquid separator 90, and the gas-liquid separator 90 is connected to the biodegradation tank 100.

It should be noted that, a micro-interface unit 130 for dispersing and crushing gas into micro gas bubbles is disposed inside the wet oxidation reactor 80. The micro-interface unit includes a pneumatic micro-interface generator 132. A gas inlet 82 is disposed on the side wall of the wet oxidation reactor 80, and the gas inlet 82 extends to the interior of the pneumatic micro-interface generator 132 through a pipeline. The gas inlet 82 is in communication with an air compressor, and air or oxygen enters the interior of the pneumatic micro-interface generator 132 through the gas inlet 82 after being compressed by the air compressor to be dispersed and broken into gas bubbles, which increases the contact area of a gas-liquid phase and improves the mass transfer effect. Herein, the air compressor is preferably a centrifugal air compressor, because the centrifugal air compressor has a large air volume and does not need lubrication inside, which can save oil and will not pollute the compressed gas.

In one embodiment, the micro-interface unit 130 further includes a hydraulic micro-interface generator 131. Wastewater circulating back from the wet oxidation reactor 80 is introduced into the hydraulic micro-interface generator 131, preferably, the circulation of the wastewater is achieved by means of a circulation pump. The hydraulic micro-interface generator 131 is connected to a gas guide pipe, and a top end of the gas guide pipe extends out above a liquid surface of the wet oxidation reactor 80 for recovering air or oxygen.

In this embodiment, the outlet of the hydraulic micro-interface generator 131 is disposed opposite to the outlet of the pneumatic micro-interface generator 132 so as to clash and improve the reaction effect. A plurality of support plates 133 for supporting each other are disposed between the hydraulic micro-interface generator 131 and the pneumatic micro-interface generator 132. The plurality of support plates 133 are sequentially stacked from top to bottom. Preferably, an anti-slip pad or an anti-slip ring is disposed between two adjacent support plates 133 for preventing slippage between the two adjacent support plates 133.

Specifically, a wastewater circulation pipeline is further disposed outside the wet oxidation reactor 80 so as to provide a liquid drive for the hydraulic micro-interface generator 131. One end of the circulation pipeline is connected to the top of the hydraulic micro-interface generator 131, and the other end of the circulation pipeline is connected to a side wall of the wet oxidation reactor 80. The wastewater circulation pipeline provides the entrainment power to the hydraulic micro interface generator 131, so as to entrain the air or oxygen above the liquid surface of the wet oxidation reactor 80 back through a gas guide pipe, thereby improving the mass transfer effect between gas and liquid phases.

In addition, the oxidation water coming out of the oxidation outlet 81 will contain a part of oxygen. Therefore, after entering the heat exchanger 70 for heat exchange, the oxidation water then enters the gas-liquid separator 90 through the second outlet 74 for gas-liquid separation. Preferably, a cooler is added between the second outlet 74 and the gas-liquid separator 90 for cooling before the wastewater enters the gas-liquid separator 90 after heat exchange. The tail gas is recovered from the top of the gas-liquid separator 90, and the liquid is collected from the bottom of the gas-liquid separator 90 and then enters the biodegradation tank 100 for biodegradation treatment.

In this embodiment, the treatment system further includes a COD concentration detection device 110 and a clean water tank 120, wherein the COD concentration detection device 110 is connected to a water outlet of the biodegradable tank 100 for monitoring water quality and discharging the water into the clean water tank 120 after being qualified. Water after biodegradation treatment enters the COD concentration detection device 110 for detection. Clean water with a COD concentration that meets requirements is finally obtained. The clean water is introduced into the clean water tank 120 for ultraviolet or ozone disinfection and then recycled.

It can be understood that, the number of the micro-interface generators in the described embodiment is not limited thereto, and additional micro-interface generators can also be additionally provided in order to improve the dispersion and mass transfer effects. In particular, the mounting position of the micro-interface generator is not limited, and the micro-interface generator may be built-in or built-out. When the micro-interface generator is built-in, the micro-interface generator can also be mounted on the side wall of the wet oxidation reactor in an opposite manner, so that micro gas bubbles coming out from the outlet of the micro-interface generator are flushed.

The operation process and principle of the built-in micro-interface papermaking wastewater treatment system of the present invention are briefly described as follows:

papermaking wastewater entering the grid cleaner 20 from the papermaking wastewater tank 10 and then removing large-scale floating substances and suspended substances, then entering the adjustment tank 30 to adjust the water volume and water quality, and then entering a centrifugal filter 40; separating suspended particles from the wastewater under the action of centrifugal force, and liquid obtained by centrifugal filtration entering a sedimentation tank to remove heavy metals and particulate matter precipitates; and heating the wastewater treated by the above-described steps and then entering a wet oxidation reactor 80 for a wet oxidation treatment, air or oxygen compressed by an air compressor entering a micro-interface unit 130 for dispersing and breaking into micro gas bubbles, and the gas bubbles and the wastewater being subjected to an oxidation reaction; and the reaction temperature of the wet oxidation in the reactor is 175-185° C., the reaction pressure is 3.1-3.6 MPa, preferably the reaction temperature is 180° C., and the reaction pressure is 3.3 MPa; the oxidation water entering a heat exchanger 70 through an oxidation outlet 81 and exchanging heat with wastewater to be treated, and then entering a gas-liquid separator 90 through a cooler; recovering the tail gas from the top of the gas-liquid separator 90, and collecting liquid from the bottom of the gas-liquid separator 90 and then the liquid entering a biodegradation tank 100 for biodegradation treatment; and the biodegradable water entering a clean water tank 120 after being detected and calibrated through a COD concentration detection device 110 and being disinfected and recycled.

So far, the technical solution of the invention has been described in conjunction with the preferred embodiments shown in the drawings. However, it is easily understood by those skilled in the art that the protection scope of the invention is obviously not limited to these specific embodiments. Without departing from the principle of the invention, those skilled in the art can make equivalent changes or substitutions to the relevant technical features, which will fall into the protection scope of the invention. The above are only preferred embodiments of the invention rather than limits to the invention. Those skilled in the art may make various modifications and changes to the invention. Any modification, equivalent replacement, improvement and the like made within the spirit and principle of the invention all should be included in the protection scope of the invention.

The invention claimed is:

1. A built-in micro-interface papermaking wastewater treatment system, comprising a papermaking wastewater tank, a grid cleaner, an adjustment tank, a centrifugal filter and a sedimentation tank which are connected in sequence, and further comprising a heat exchanger, a preheater, a wet oxidation reactor, a gas-liquid separator and a biodegradation tank, wherein a first inlet, a first outlet, a second inlet, and a second outlet are disposed on the heat exchanger;

wherein the sedimentation tank is connected to the first inlet, the first outlet is connected to a bottom of the wet oxidation reactor through the preheater, an oxidation outlet is disposed on a top of the wet oxidation reactor, the oxidation outlet is connected to the second inlet, the second outlet is connected to the gas-liquid separator, and the gas-liquid separator is connected to the biodegradation tank; and wherein a micro-interface unit for dispersing and crushing gas into gas bubbles is disposed inside the wet oxidation reactor, the micro-interface unit comprises a pneumatic micro-interface generator, a gas inlet is disposed at a side wall of the wet oxidation reactor, and the gas inlet extends to an interior of the pneumatic micro-interface generator through a pipeline;

wherein the micro-interface unit further comprises a hydraulic micro-interface generator, wastewater circulating back from the wet oxidation reactor is introduced into the hydraulic micro-interface generator, the hydraulic micro-interface generator is connected to a gas guide pipe, and a top end of the gas guide pipe extends out of a liquid surface of the wet oxidation reactor for recovering air or oxygen.

2. The built-in micro-interface papermaking wastewater treatment system according to claim 1, wherein an outlet of the hydraulic micro-interface generator is disposed opposite to an outlet of the pneumatic micro-interface generator so as to clash and enhance a reaction effect.

3. The built-in micro-interface papermaking wastewater treatment system according to claim 1, wherein a plurality of support plates for supporting each other are disposed between the hydraulic micro-interface generator and the pneumatic micro-interface generator, the plurality of support plates are sequentially stacked from top to bottom, and an anti-slip pad or an anti-slip ring is disposed between two adjacent support plates of the plurality of support plates for preventing slippage between the two adjacent support plates.

4. The built-in micro-interface papermaking wastewater treatment system according to claim 1, wherein a wastewater circulation pipeline for communicating wastewater circulating back from the wet oxidation reactor is further disposed outside the wet oxidation reactor, one end of the wastewater circulation pipeline is connected to the side wall of the wet oxidation reactor, and the other end of the wastewater circulation pipeline is connected to a top of the hydraulic micro-interface generator.

5. The built-in micro-interface papermaking wastewater treatment system according to claim 4, wherein a circulation pump is disposed on the wastewater circulation pipeline, and a booster pump is disposed between the sedimentation tank and the heat exchanger.

6. The built-in micro-interface papermaking wastewater treatment system according to claim 1, wherein the treatment system further comprises a COD concentration detection device and a clean water tank, the COD concentration detection device being connected to a water outlet of the biodegradation tank for monitoring a water quality and discharging the water after being qualified into the clean water tank.

7. The built-in micro-interface papermaking wastewater treatment system according to claim 1, wherein the wet oxidation reactor is a bubble slurry bed reactor.

8. A wastewater treatment method by using a built-in micro-interface papermaking wastewater treatment system, the built-in micro-interface papermaking wastewater treatment system comprising a papermaking wastewater tank, a grid cleaner, an adjustment tank, a centrifugal filter and a sedimentation tank which are connected in sequence, and further comprising a heat exchanger, a preheater, a wet oxidation reactor, a gas-liquid separator and a biodegradation tank, wherein a first inlet, a first outlet, a second inlet, and a second outlet are disposed on the heat exchanger; wherein the sedimentation tank is connected to the first inlet, the first outlet is connected to a bottom of the wet oxidation reactor through the preheater, an oxidation outlet is disposed on a top of the wet oxidation reactor, the oxidation outlet is connected to the second inlet, the second outlet is connected to the gas-liquid separator, and the gas-liquid separator is connected to the biodegradation tank; and wherein a micro-interface unit for dispersing and crushing gas into gas bubbles is disposed inside the wet oxidation reactor, the micro-interface unit comprises a pneumatic micro-interface generator, a gas inlet is disposed at a side wall of the wet oxidation reactor, and the gas inlet extends to an interior of the pneumatic micro-interface generator through a pipeline;

wherein the micro-interface unit further comprises a hydraulic micro-interface generator, wastewater circulating back from the wet oxidation reactor is introduced into the hydraulic micro-interface generator, the hydraulic micro-interface generator is connected to a gas guide pipe, and a top end of the gas guide pipe extends out of a liquid surface of the wet oxidation reactor for recovering air or oxygen, the wastewater treatment method comprising the following steps:

a papermaking wastewater first entering the grid cleaner and then removing large-scale floating substances and suspended substances, then entering the adjustment tank to regulate a water volume and a water quality, and then entering the centrifugal filter; separating suspended particles from the papermaking wastewater under an action of centrifugal force, and liquid obtained by centrifugal filtration entering the sedimentation tank to remove heavy metals and particulate substance precipitates;

heating the wastewater treated by the above steps and then entering the wet oxidation reactor for a wet oxidation treatment, introducing compressed air or oxygen into the wet oxidation reactor to cause an oxidative decomposition reaction of organic substances in the wastewater, and dispersing and crushing the compressed air or oxygen through a micro-interface unit; and a product after the wet oxidation treatment entering the gas-liquid separator after heat exchange, and the separated liquid entering the biodegradation tank for biodegradation and being recovered.

9. The wastewater treatment method according to claim 8, wherein a reaction temperature of the wet oxidation treatment is 175-185° C., and a reaction pressure is 3.1-3.6 MPa.

* * * * *